United States Patent
Kizaki (10) Patent No.: US 8,428,802 B2
(45) Date of Patent: Apr. 23, 2013

(54) VEHICLE ASSISTANCE SYSTEM

(75) Inventor: Mikio Kizaki, Toyoake (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 853 days.

(21) Appl. No.: 12/293,134

(22) PCT Filed: Mar. 6, 2007

(86) PCT No.: PCT/JP2007/054760
§ 371 (c)(1),
(2), (4) Date: Sep. 16, 2008

(87) PCT Pub. No.: WO2007/113990
PCT Pub. Date: Oct. 11, 2007

(65) Prior Publication Data
US 2009/0088915 A1   Apr. 2, 2009

(30) Foreign Application Priority Data
Apr. 4, 2006 (JP) ................. 2006-102740

(51) Int. Cl.
*B60L 9/00* (2006.01)
*B60L 11/00* (2006.01)

(52) U.S. Cl.
USPC ............... 701/22; 439/500; 320/104; 105/35

(58) Field of Classification Search ............. 701/1, 22, 701/36; 320/103–105, 134, 126, 136; 429/400, 429/428, 515; 105/35; 60/413; 180/65.31; 439/500
See application file for complete search history.

(56) References Cited

U.S. PATENT DOCUMENTS

| | | | |
|---|---|---|---|
| 408,231 A | 8/1889 | Griscom | |
| 4,489,242 A * | 12/1984 | Worst | 307/10.1 |
| 5,536,173 A * | 7/1996 | Fujitani et al. | 439/34 |
| 5,998,960 A * | 12/1999 | Yamada et al. | 320/104 |
| 7,339,347 B2 * | 3/2008 | Elder et al. | 320/104 |
| 7,692,402 B2 * | 4/2010 | Wise | 320/105 |
| 2003/0010399 A1 | 1/2003 | Friebe et al. | |
| 2004/0065489 A1 * | 4/2004 | Aberle et al. | 180/65.1 |
| 2005/0035737 A1 * | 2/2005 | Elder et al. | 320/103 |
| 2005/0211482 A1 * | 9/2005 | Meaney | 180/65.2 |
| 2006/0000573 A1 * | 1/2006 | Shinki et al. | 164/312 |
| 2006/0005736 A1 * | 1/2006 | Kumar | 105/1.4 |

(Continued)

FOREIGN PATENT DOCUMENTS

| DE | 198 13 146 A1 | 10/1998 |
|---|---|---|
| DE | 694 14 772 T2 | 4/1999 |

(Continued)

OTHER PUBLICATIONS

Toyota Prius 2006 Pocket Reference Guide, from Toyota Corp., 2006.*

(Continued)

*Primary Examiner* — Cuong H Nguyen
(74) *Attorney, Agent, or Firm* — Kenyon & Kenyon LLP (57) ABSTRACT

There is disclosed a vehicle assistance system including an assistance vehicle provided with a power source; an assisted vehicle driven by power; and an electric cable which electrically connects the assistance vehicle to the assisted vehicle, wherein the power of the power source is supplied from the assistance vehicle to the assisted vehicle via the electric cable.

11 Claims, 3 Drawing Sheets

1

U.S. PATENT DOCUMENTS

| | | | |
|---|---|---|---|
| 2006/0005737 A1* | 1/2006 | Kumar | 105/35 |
| 2007/0298313 A1* | 12/2007 | Iida | 429/49 |
| 2009/0055061 A1* | 2/2009 | Zhu | 701/55 |
| 2009/0088915 A1* | 4/2009 | Kizaki | 701/22 |
| 2010/0089672 A1* | 4/2010 | Lee et al. | 180/65.275 |
| 2010/0101879 A1* | 4/2010 | McVickers | 180/65.51 |

FOREIGN PATENT DOCUMENTS

| | | | |
|---|---|---|---|
| JP | 2000-308208 A | | 11/2000 |
| JP | 2001-1791 A | | 1/2001 |
| JP | PCT/IB03/04338 | * | 3/2005 |
| JP | 2005-119330 A | | 5/2005 |
| JP | PCT/JP2008/054250 | * | 6/2009 |
| KR | 10-2008-0099844 | * | 10/2008 |

OTHER PUBLICATIONS

Investigation of feasibility of integrating alternative energy sources in a roadside assistance vehicle; Overington, S.; Rajakaruna, S.; Islam, S.; Chandratilleke, T.; Universities Power Engineering Conference (AUPEC), 2010 20th Australasian; Publication Year: 2010, pp. 1-7.*

Official Car Talk® Jump-Start Instructions, From Google search, no date.*

Elder et al., (S Pat. 7,339,347) for "Apparatus and method for reliably supplying electrical energy to an electrical system" with prior publication data of Feb. 17, 2005. Wise (US Pat. 7,692,402) "Emergency Applicance System" filed Dec. 21, 2006.*

2006 Toyota Prius Pocket Reference Guide, printed in US, Oct. 2005.*

Dynamic evolution control of bidirectional DC-DC converter for interfacing ultracapacitor energy storage to Fuel Cell Electric Vehicle system; Samosir, A.S.; Yatim, A.; Power Engineering Conference, 2008. AUPEC '08. Australasian Universities Publication Year: 2008, pp. 1-6.*

Simulation and field-testing of hybrid ultra-capacitor/battery energy storage systems for electric and hybrid-electric transit vehicles;Anstrom, J.R.; Zile, B.; Smith, K.; Hofmann, H.; Batra, A.; Applied Power Electronics Conference and Exposition, 2005. APEC 2005. Twentieth Annual IEEE; vol. 1; Digital Object Identifier: 10.1109/APEC.2005.1.*

Development of Fuel Cell Hybrid Vehicles in Toyota; Aso, S.; Kizaki, M.; Nonobe, Y.; Power Conversion Conference—Nagoya, 2007. PCC '07; Digital Object Identifier: 10.1109/PCCON.2007.373179; Publication Year: 2007, pp. 1606-1611.*

Plastic lithium ion energy/power systems are key to integrated and affordable hybrid automotive solutions; Ahrens, D.W.; Hanauer, B.T.; Waters, J.E.; Digital Avionics Systems Conference, 1999. Proceedings. 18th; vol. 2; Digital Object Identifier: 10.1109/DASC. 1999.863654; Publication Year: 1999, pp. 8.B.5-1-8.B.5-12 vol. 2.*

Recent development of rechargeable lithium-ion cells at JPL; Chen-Kuo Huang; Smart, M.; Davies, E.; Surampudi, S. Battery Conference on Applications and Advances, 1996., Eleventh Annual; Digital Object Identifier: 10.1109/BCAA.1996.485017 Publication Year: 1996, pp. 325-328.*

Model Predictive Control for power management in hybrid fuel cell vehicles; Bordons, C.; Ridao, M.A.; Pérez, A.; Arce, A.; Marcos, D.; Vehicle Power and Propulsion Conference (VPPC), 2010 IEEEL Digital Object Identifier: 10.1109/VPPC.2010.5729119 Publication Year: 2010, pp. 1-6.*

Integrating battery energy storage with a BMS for reliability, efficiency, and safety in vehicles; Chet, S.P.E. Transportation Electrification Conference and Expo (ITEC), 2012 IEEE; Digital Object Identifier: 10.1109/ITEC.2012.6243439 Publication Year: 2012, pp. 1-3.*

Hybrid energy storage systems for high-performance hybrid electric vehicles; Nielson, G.; Emadi, A.; Vehicle Power and Propulsion Conference (VPPC), 2011 IEEE; Digital Object Identifier: 10.1109/VPPC.2011.6043052; Publication Year: 2011, pp. 1-6.*

Optimal power flow for hybrid ultracapacitor systems in light electric vehicles; Laldin, O.; Moshirvaziri, M.; Trescases, O. Energy Conversion Congress and Exposition (ECCE), 2011 IEEE ; Digital Object Identifier: 10.1109/ECCE.2011.6064161 Publication Year: 2011, pp. 2916-2922.*

* cited by examiner

Fig. 2

VEHICLE ASSISTANCE SYSTEM

This is a 371 national phase application of PCT/JP2007/054760 filed 6 Mar. 2007, which claims priority to Japanese Patent Application No. 2006-102740 filed 4 Apr. 2006, the contents of which are incorporated herein by reference.

TECHNICAL FIELD

The present invention relates to a vehicle assistance system.

BACKGROUND ART

At present, a fuel cell vehicle which runs when driven by the power of a fuel cell as a driving source has been suggested and put to practical use, the fuel cell being configured to receive the supply of a reaction gas (a fuel gas and an oxidizing gas), thereby generating the power. When a certain defect occurs in the fuel cell as the driving source of such a fuel cell vehicle, energy for driving cannot be obtained.

To solve the problem, in recent years, various technologies for towing the fuel cell vehicle having failure have been suggested. For example, a technology is suggested which employs an emergency switch for unlocking the tires of the fuel cell vehicle to be towed so that the tires can freely rotate (e.g., see Japanese Patent Application Laid-Open No. 2005-119330).

DISCLOSURE OF THE INVENTION

In addition, when a fuel cell mounted on a fuel cell vehicle fails, any power cannot be supplied to various auxiliary devices. Therefore, for example, in a case where the fuel cell vehicle is provided with a power steering device operated by power, a problem occurs that the power steering device is not operated owing to the failure of the fuel cell, and it becomes remarkably difficult to run the vehicle. Moreover, a low-voltage (e.g., 12 V) battery for use in starting the fuel cell or the like is usually mounted on the fuel cell vehicle. However, when the fuel cell fails, a hazard light or the like is lit by the power of the low-voltage battery, which causes a problem that the battery easily runs out.

When the technology disclosed in Japanese Patent Application Laid-Open No. 2005-119330 is employed, the towing of the fuel cell vehicle by a towing vehicle can be allowed. However, various defects (a defect that the power steering device becomes inoperative, a defect that the battery runs out and the like) caused by the failure of the fuel cell cannot be solved.

The present invention has been developed in view of such a situation, and an object thereof is to provide a vehicle assistance system capable of solving various defects generated in a case where a power source (e.g., a fuel cell or the like) mounted on a vehicle (e.g., a fuel cell vehicle or the like) driven by power fails.

To achieve the object, a vehicle assistance system according to the present invention comprises an assistance vehicle provided with a power source, an assisted vehicle driven by power, and an electric cable which electrically connects the assistance vehicle to the assisted vehicle, wherein the power of the power source is supplied from the assistance vehicle to the assisted vehicle via the electric cable.

According to such a constitution, the power of the power source provided in the assistance vehicle can be supplied from the assistance vehicle to the assisted vehicle via the electric cable. Therefore, for example, in a case where the assisted vehicle is provided with a power steering device which is operated by the power, the power steering device of the assisted vehicle is operated by the power supplied from the power source of the assistance vehicle, so that the running of the assisted vehicle can be facilitated. Moreover, the hazard light or the like of the assisted vehicle can be lit by the power supplied from the power source of the assistance vehicle, so that wear on a battery mounted on the assisted vehicle can be inhibited. That is, various defects generated in a case where the power source mounted on the assisted vehicle fails can be solved.

In the vehicle assistance system, the assistance vehicle may be a vehicle (a fuel cell vehicle) provided with a fuel cell and driven by power supplied from this fuel cell. In such a case, the fuel cell of the assistance vehicle may function as the power source which supplies the power to the assisted vehicle.

Moreover, in the vehicle assistance system, the assistance vehicle may be a vehicle (an electric car) provided with a storage cell and driven by power supplied from this storage cell. In such a case, the storage cell of the assistance vehicle may function as the power source which supplies the power to the assisted vehicle.

Furthermore, in the vehicle assistance system, the assistance vehicle may be a vehicle (a hybrid vehicle) provided with a storage cell and an engine and driven by at least one of power supplied from the storage cell and motive energy obtained from the engine. In such a case, the storage cell of the assistance vehicle may function as the power source which supplies the power to the assisted vehicle.

In addition, in the vehicle assistance system, as the assisted vehicle, there can be employed the fuel cell vehicle (the vehicle provided with the fuel cell and driven by the power supplied from this fuel cell), the electric car (the vehicle provided with the storage cell and driven by the power supplied from this storage cell) or the hybrid vehicle (the vehicle provided with the storage cell and the engine and driven by at least one of the power supplied from the storage cell and the motive energy obtained from the engine).

According to the present invention, there can be provided the vehicle assistance system capable of solving various defects generated in a case where the power source (e.g., the fuel cell or the like) mounted on the vehicle (e.g., the fuel cell vehicle or the like) driven by power fails.

BEST MODE FOR CARRYING OUT THE INVENTION

A vehicle assistance system 1 according to an embodiment of the present invention will hereinafter be described with reference to the drawings. In the present embodiment, the system will be described in which two fuel cell vehicles are connected to each other via an electric cable and in which when a fuel cell mounted on one of the fuel cell vehicles fails, the power of a fuel cell mounted on the other fuel cell vehicle (an assistance vehicle) is supplied to the one fuel cell vehicle (an assisted vehicle) via the electric cable.

Figure 1:
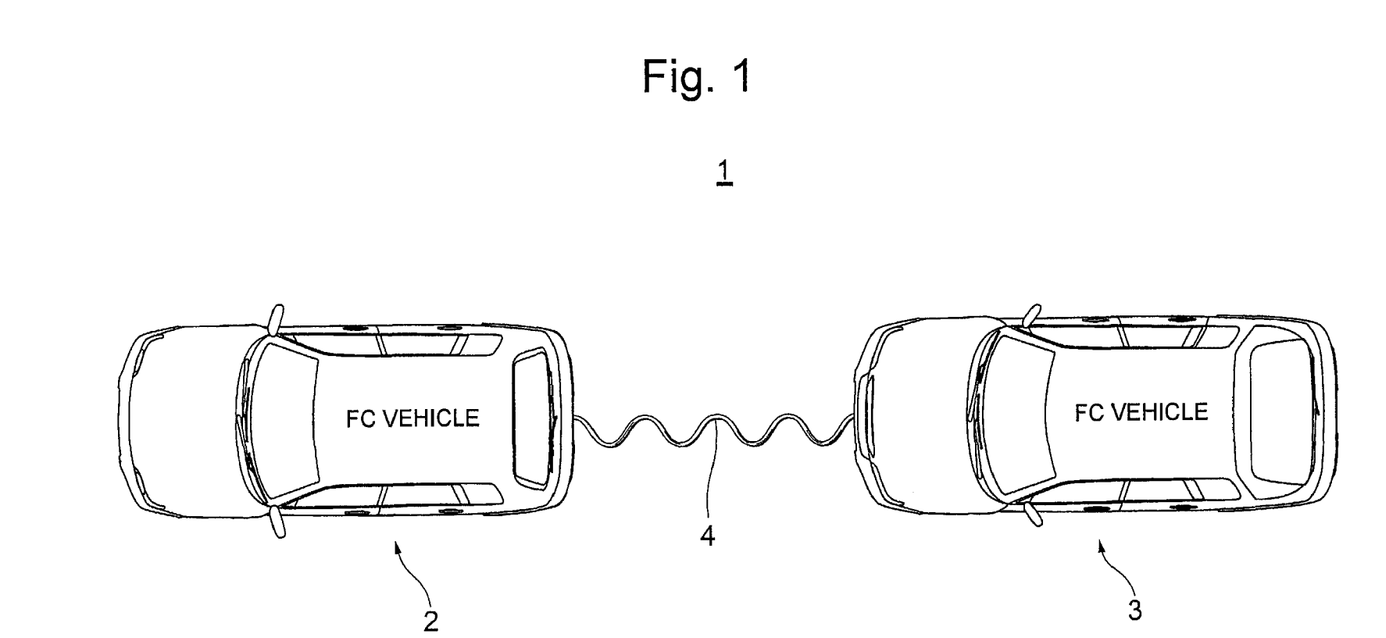
FIG. 1 is a conceptual diagram showing a vehicle assistance system according to an embodiment of the present invention.

First, the constitution of the vehicle assistance system 1 according to the present embodiment will be described with reference to FIGS. 1 and 2. As shown in FIG. 1, the vehicle assistance system 1 includes a first fuel cell vehicle (hereinafter referred to as the "first vehicle") 2, a second fuel cell vehicle (hereinafter referred to as the "second vehicle") 3, and an electric cable 4 which electrically connects these vehicles to each other.

Figure 2:
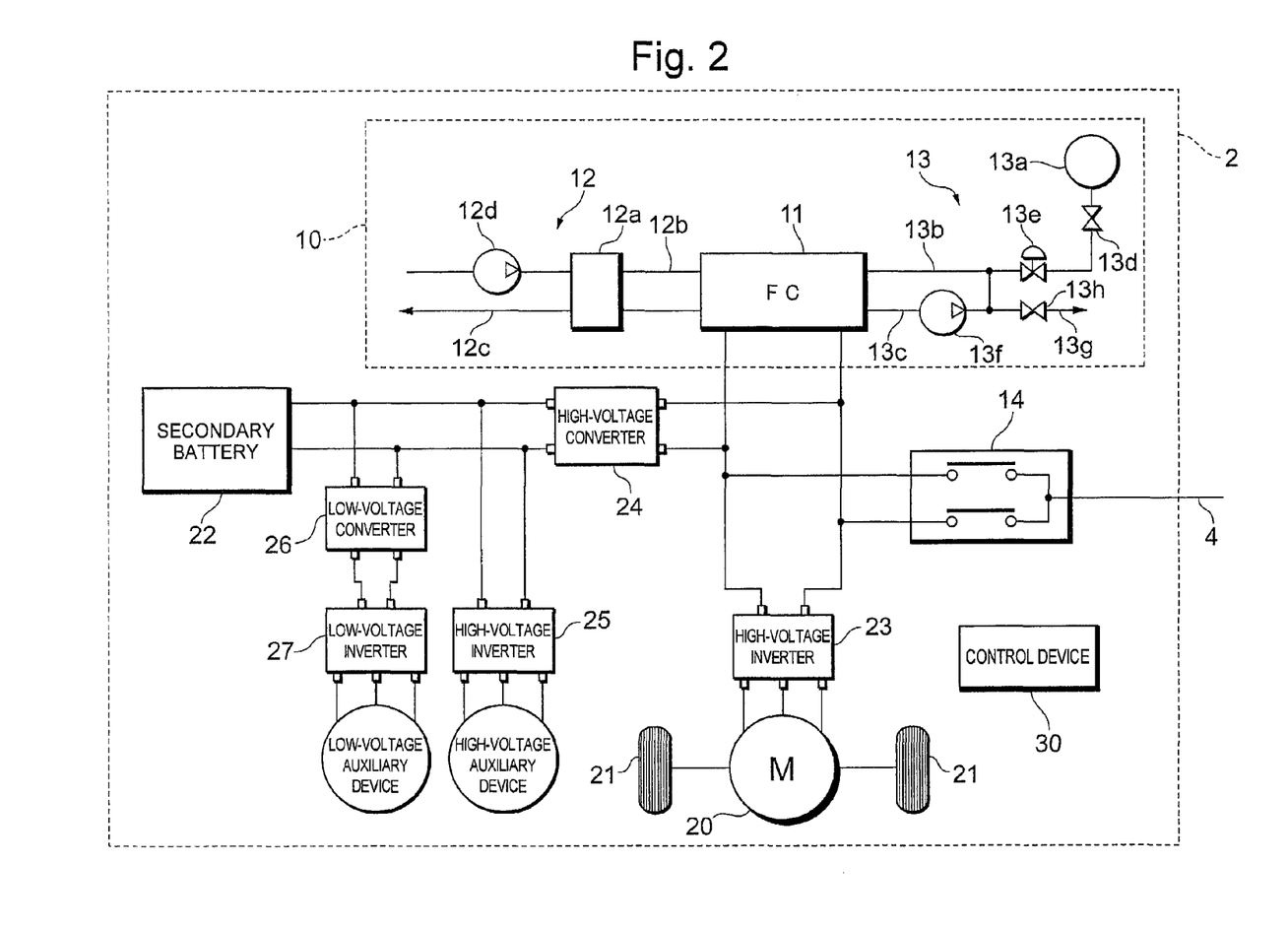
FIG. 2 is a constitution diagram of a fuel cell vehicle included in the vehicle assistance system shown in FIG. 1.

As shown in FIG. 2, the first vehicle 2 runs with wheels 21 rotated by the driving force of a traction motor 20 driven by power generated in a fuel cell 11 of a fuel cell system 10. The first vehicle 2 is provided with a secondary battery 22 in addition to the fuel cell 11 as power sources which supply the power to the traction motor 20, and a direct current output from these power sources is converted into an alternate current by a high-voltage inverter 23, and supplied to the traction motor 20. To brake the first vehicle 2, the traction motor 20 is driven by the wheels 21, and the traction motor 20 functions as a power generator to generate alternate-current power. Such an alternate current is converted into the direct current by the high-voltage inverter 23 to charge the secondary battery 22. Moreover, the first vehicle 2 includes a control device 30 which integrally controls various electronic units.

As shown in FIG. 2, the fuel cell system 10 includes the fuel cell 11 which receives the supply of a reaction gas (an oxidizing gas and a fuel gas) to generate the power, and also includes an oxidizing gas piping system 12 which supplies air as the oxidizing gas to the fuel cell 11, a hydrogen gas piping system 13 which supplies a hydrogen gas as the fuel gas to the fuel cell 11 and the like.

The fuel cell 11 has a stack structure in which the required number of unitary cells for receiving the supply of the reaction gas to generate the power are laminated. The present embodiment uses the fuel cell 11 of a solid polymer electrolytic type capable of starting at ordinary temperature and having a comparatively short start time. The power generated in the fuel cell 11 can be supplied to the traction motor 20 via the high-voltage inverter 23.

The oxidizing gas piping system 12 includes an air supply channel 12*b* which supplies to the fuel cell 11 the oxidizing gas (air) humidified by a humidifier 12*a*, and an air discharge channel 12*c* which guides to the outside, an oxidizing off gas discharged from the fuel cell 11. The air supply channel 12*b* is provided with an air compressor 12*d* which takes the oxidizing gas from the atmosphere to feed the gas under pressure to the humidifier 12*a*.

The hydrogen gas piping system 13 includes a hydrogen tank 13*a* as a fuel supply source in which a high-voltage hydrogen gas is received, a hydrogen supply channel 13*b* for supplying the hydrogen gas from the hydrogen tank 13*a* to the fuel cell 11, and a circulation channel 13*c* for returning to the hydrogen supply channel 13*b* a hydrogen off gas discharged from the fuel cell 11. The hydrogen supply channel 13*b* is provided with a shut valve 13*d* which shuts or allows the supply of the hydrogen gas from the hydrogen tank 13*a*, and a regulator 13*e* which adjusts the pressure of the hydrogen gas. The circulation channel 13*c* is provided with a hydrogen pump 13*f* which pressurizes the hydrogen off gas in the circulation channel 13*c* to feed the gas to a hydrogen supply channel 13*b* side. Moreover, the circulation channel 13*c* is branched and connected to a discharge channel 13*g*, and the discharge channel 13*g* is provided with a purge valve 13*h*.

The traction motor 20 is an electromotive motor for obtaining a driving force for running vehicle, and is constituted of, for example, a three-phase synchronous motor. To employ a two-wheel or four-wheel driving constitution in which the traction motor 20 is used as an in-wheel motor, the output terminals of the fuel cell 11 are connected to two or four high-voltage inverters 23 in parallel, and the respective high-voltage inverters 23 may be connected to the traction motor 20. It is to be noted that when a direct-current motor is used as the traction motor 20, the high-voltage inverter 23 is not necessary.

The secondary battery 22 is a chargeable/dischargeable storage cell, and functions as a high-voltage power storage device. The secondary battery 22 performs power assist at a time when an insufficient running state (an acceleration transient state, a high load operation state or the like) is only achieved with the output of the fuel cell 11. Moreover, in a running state (a vehicle stop state, a low-load operation state or the like) in which the operation of the fuel cell 11 is stopped or efficiently preferably stopped, the first vehicle 2 runs only with the power of the secondary battery 22. As the secondary battery 22, for example, a nickel hydrogen cell, a lithium ion cell or the like may be employed, and the capacity of the secondary battery can appropriately be set in accordance with the running conditions of the first vehicle 2, a running performance such as a maximum speed, a weight or the like.

As shown in FIG. 2, the secondary battery 22 is connected in parallel to the fuel cell 11 and the high-voltage inverter 23 via a high-voltage DC/DC converter 24. The high-voltage DC/DC converter 24 is a direct-current voltage converter, and has a function of adjusting the direct-current voltage input from the fuel cell 11 or the traction motor 20 to output the voltage to a secondary battery 22 side, and a function of adjusting the direct-current voltage input from the secondary battery 22 to output the voltage to a high-voltage inverter 23 side. Owing to these functions of the high-voltage DC/DC converter 24, the secondary battery 22 can be charged and discharged, and the output voltage of the fuel cell 11 can be controlled.

As shown in FIG. 2, a high-voltage auxiliary device is connected between the secondary battery 22 and the high-voltage DC/DC converter 24 via a high-voltage inverter 25. The high-voltage inverter 25 converts, into an alternate current, the direct current input from the fuel cell 11 or the secondary battery 22 to output the current to a high-voltage auxiliary device side. The high-voltage auxiliary device corresponds to the air compressor 12*d*, hydrogen pump 13*f* or the like of the fuel cell system 10.

Moreover, as shown in FIG. 2, a low-voltage auxiliary device is connected between the secondary battery 22 and the high-voltage DC/DC converter 24 via a low-voltage DC/DC converter 26 and a low-voltage inverter 27. The low-voltage DC/DC converter 26 is a direct-current voltage converter, and has a function of adjusting the direct-current voltage input from the fuel cell 11 or the secondary battery 22 to output the voltage to a low-voltage inverter 27 side. The low-voltage inverter 27 converts, into an alternate current, the direct current input via the low-voltage DC/DC converter 26 to output the current to a low-voltage auxiliary device side. The low-voltage auxiliary device corresponds to any type of electronic unit such as an air conditioner driven by a low voltage (e.g., 12 V), any light or an electromotive power steering device. It is to be noted that in the present embodiment, when the fuel cell system 10 fails, the power can be supplied from a low-voltage battery (not shown) to the low-voltage auxiliary device to turn on any type of light such as a hazard light.

Furthermore, the fuel cell 11 and the secondary battery 22 are connected to the electric cable 4 via a relay 14. The relay 14 performs a function of supplying the power from the fuel cell 11 and the secondary battery 22 to the outside or shutting the supply. The control device 30 controls the turning on/off of the relay 14 via a relay switch (not shown) to realize the power supply from the fuel cell 11 or the secondary battery 22 to the outside and the shutting of the supply. The power generated in the fuel cell 11 of the first vehicle 2 and the power stored in the secondary battery 22 are supplied to the second vehicle 3 via the electric cable 4. That is, the fuel cell 11 and the secondary battery 22 can function as one embodiment of the power source in the present invention.

The control device 30 receives detected information such as an acceleration signal (a demanded load) of the vehicle to control the operation of each electronic unit mounted on the first vehicle 2. The control device 30 is constituted of a computer system (not shown). Such a computer system includes a CPU, a ROM, a RAM, an HDD, an input/output interface, a display and the like. The CPU reads various control programs recorded in the ROM to execute the programs, whereby various control operations are realized.

Specifically, the control device 30 calculates a demanded system power (e.g., the sum of vehicle running power and auxiliary device power) based on an accelerator open degree, a vehicle speed or the like to control the output of the fuel cell 11 so that the output matches target power. Here, the vehicle running power is the demanded power of the traction motor 20, and the auxiliary device power is power obtained by totaling the power required for the auxiliary devices. The demanded power of the traction motor 20 is calculated by the control device 30 based on the accelerator open degree or the like. The control device 30 controls the operation of the high-voltage DC/DC converter 24 to adjust the operation point (an output voltage, an output current) of the fuel cell 11 so that the demanded system power is supplied. In this case, the control device 30 controls the switching of the high-voltage inverter 23 to output a three-phase alternate current to the traction motor 20 in accordance with the vehicle running power. Moreover, the control device 30 controls the operations of the air compressor 12*d* and the hydrogen pump 13*f* to control the supply of the reaction gas (the air and the hydrogen gas) in accordance with the target power of the fuel cell 11.

Moreover, the control device 30 controls the relay 14 so that the relay closes in a case where the supply of the power to the outside (the second vehicle 3) is required, whereby the power generated in the fuel cell 11 and the power stored in the secondary battery 22 are supplied to the outside (the second vehicle 3) via the electric cable 4. Furthermore, the control device 30 controls the relay 14 so that the relay closes even in a case where failure is occurred in the fuel cell system 10 and the fuel cell 11 cannot generate any power. Owing to such control, the first vehicle 2 can receive the supply of the power from the outside (the second vehicle 3) in a case where the fuel cell system 10 fails, and the traction motor 20 and the auxiliary devices can be driven by this supplied power.

The constitution of the second vehicle 3 is substantially the same as that of the first vehicle 2, and hence description thereof is omitted. It is to be noted that in the following description, to refer to the constitution of the second vehicle 3, "A" is attached to the reference numeral of the constitution of the first vehicle 2 to distinguish the constitution of the second vehicle. The first vehicle 2 is electrically connected to the second vehicle 3 via the electric cable 4. Therefore, for example, even in a case where a fuel cell system 10A of the second vehicle 3 fails and a fuel cell 11A cannot generate any power, the power generated in the fuel cell 11 of the first vehicle 2 as an assistance vehicle can be supplied to the second vehicle 3 as a failure vehicle (an assisted vehicle) to assist the running of the second vehicle 3.

Figure 3:
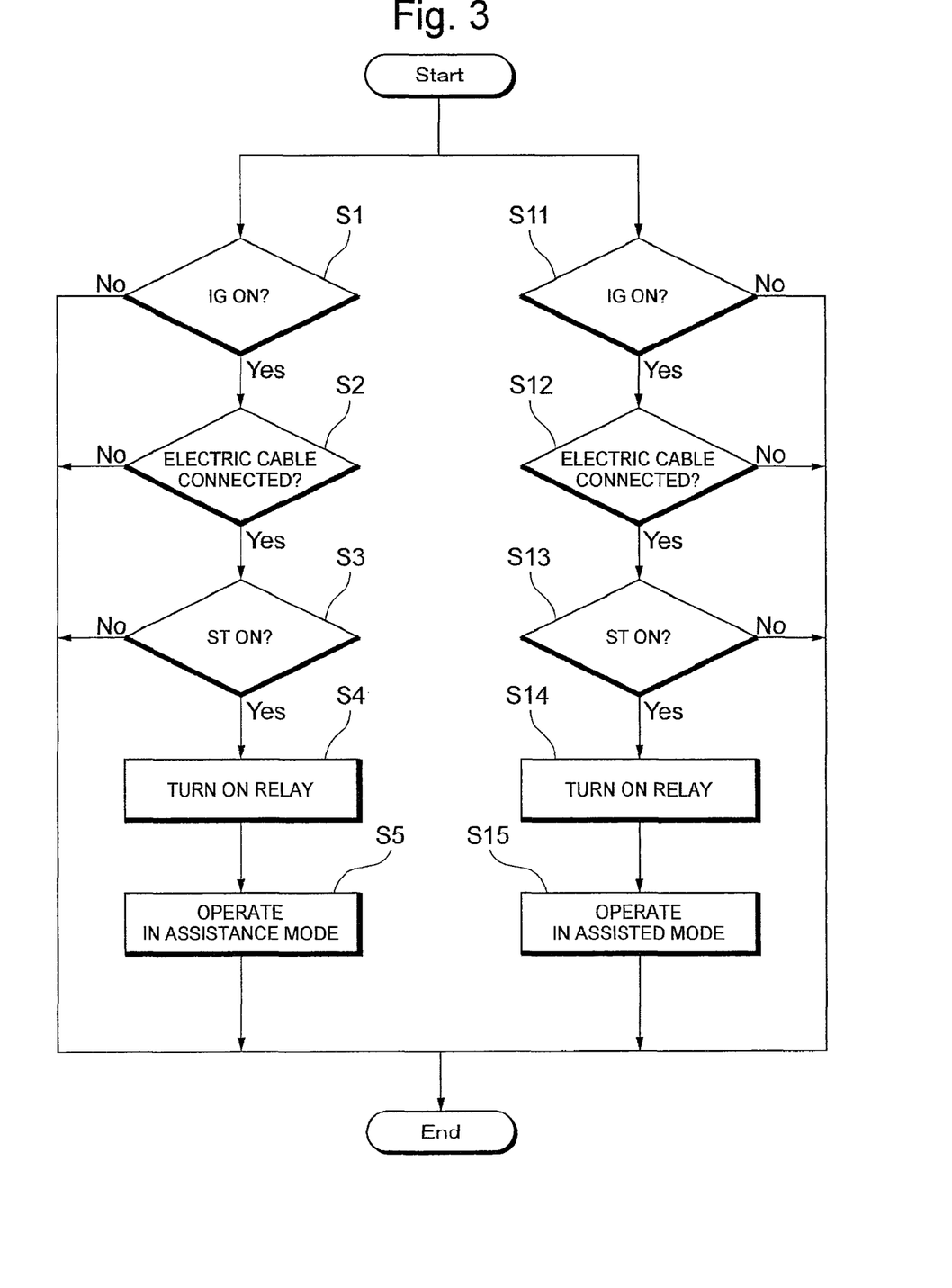
FIG. 3 is a flow chart showing a method for operating the vehicle assistance system shown in FIG. 1.

Next, a method for operating the vehicle assistance system 1 according to the present embodiment will be described with reference to a flow chart of FIG. 3. In the present embodiment, it is assumed that the fuel cell system 10A of the second vehicle 3 fails, and the operation method will be described in a case where the power generated in the fuel cell 11 of the first vehicle 2 is supplied to the second vehicle 3 to assist the running of the second vehicle 3.

<Assistance Vehicle (First Vehicle)>

First, a method for operating the first vehicle 2 as the assistance vehicle will be described. A person (a driver) who drives the first vehicle 2 inserts an engine start key into an ignition switch of the first vehicle 2 to turn the engine start key to a runnable position (an ignition position). The control device 30 of the first vehicle 2 judges whether or not the engine start key has been turned to the runnable position (a runnability judgment step: S1). When affirmative judgment is obtained, it is judged whether or not the electric cable 4 is normally connected to the vehicle (a cable connected state judgment step: S2). Then, in a case where the affirmative judgment is obtained in the cable connected state judgment step S2, the control device 30 performs predetermined display to notify the driver of the judgment.

The driver who has confirmed by the predetermined display that the electric cable 4 is normally connected turns the engine start key to a start position. The control device 30 of the first vehicle 2 judges whether or not the engine start key has been turned to the start position (a start judgment step: S3), and controls the relay 14 so as to close the relay in a case where the affirmative judgment is obtained (a relay-on step: S4). In such a relay-on step S4, the power generated in the fuel cell 11 of the first vehicle 2 and the power stored in the secondary battery 22 can be supplied to the second vehicle 3 via the electric cable 4. Afterward, the control device 30 realizes the running in an assistance mode (an assistance running step: S5). Here, the "assistance mode" is an operation mode in which the power to be consumed during the running of the first vehicle 2 is decreased as compared with usual running. It is to be noted that the control device 30 of the first vehicle 2 may be provided with "a power supply stop function (a function of stopping the power supply to the second vehicle 3 in a case where a certain abnormality is detected in the second vehicle 3)".

<Assisted Vehicle (Second Vehicle)>

Next, a method for operating the second vehicle 3 as the assisted vehicle will be described. A person (a driver) who drives the second vehicle 3 inserts an engine start key into an ignition switch of the second vehicle 3 to turn the engine start key to a runnable position. A control device 30A of the second vehicle 3 judges whether or not the engine start key has been turned to the runnable position (a runnability judgment step: S11). When affirmative judgment is obtained, it is judged whether or not the electric cable 4 is normally connected to the vehicle (a cable connected state judgment step: S12). Then, in a case where the affirmative judgment is obtained in the cable connected state judgment step S12, the control device 30A performs predetermined display to notify the driver of the judgment.

The driver who has confirmed by the predetermined display that the electric cable 4 is normally connected turns the engine start key to a start position. The control device 30A of the second vehicle 3 judges whether or not the engine start key has been turned to the start position (a start judgment step: S13), and controls the relay 14 so as to close the relay in a case where the affirmative judgment is obtained (a relay-on step: S14). In such a relay-on step S14, the power can be supplied from the first vehicle 2 to the second vehicle 3 via the electric cable 4. Afterward, the control device 30A drives various auxiliary devices such as a traction motor 20A and an electromotive power steering device with the power supplied from the first vehicle 2 to realize the running of the second vehicle 3 (an assisted running step: S15). It is to be noted that the control device 30A of the second vehicle 3 may be provided with "a tracking running function (a function of realizing the running so that a vehicle distance between the first vehicle 2 and the second vehicle 3 is kept to be substantially constant)".

In the vehicle assistance system 1 according to the above embodiment, the power of the power source (the fuel cell 11 and the secondary battery 22) provided in the first vehicle 2 as the assistance vehicle can be supplied from the first vehicle 2 to the second vehicle 3 as the assisted vehicle via the electric cable 4. Therefore, the electromotive power steering device of the second vehicle 3 can be operated with the power supplied from the power source of the first vehicle 2 to facilitate the operation of the second vehicle 3. Moreover, during the braking of the second vehicle 3, a traction motor 20A is driven by wheels 21A of the second vehicle 3, and the power-generated in this traction motor 20A is supplied to the secondary battery 22 of the first vehicle 2 to charge the battery via a high-voltage inverter 23A and the electric cable 4. That is, the regenerative braking of the second vehicle 3 can be realized via the electric cable 4, so that the braking force of the second vehicle 3 can be increased. Furthermore, the hazard light or the like of the second vehicle 3 can be lit by the power supplied from the power source of the first vehicle 2, so that the wear on the low-voltage battery mounted on the second vehicle 3 can be inhibited. That is, various defects caused by the failure of the fuel cell 11A of the second vehicle 3 can be solved.

Moreover, in the vehicle assistance system 1 according to the above embodiment, the power of the power source provided in the first vehicle 2 can be supplied from the first vehicle 2 to the second vehicle 3 via the electric cable 4, and the traction motor 20A of the second vehicle 3 can be driven and run by this supplied power. Therefore, a towing rope itself is not necessary. In addition, the assistance vehicle (the first vehicle 2) is not necessarily arranged and run ahead of the assisted vehicle (the second vehicle 3), and the largely restricted assisted vehicle can be arranged and run ahead of the assistance vehicle. Furthermore, the assisted vehicle can run backwards, so that any type of running such as the turning-over of the assisted vehicle can be realized. In consequence, labor required for transporting the assisted vehicle can remarkably be decreased.

It is to be noted that in the above embodiment, an example in which the fuel cell vehicle (the first vehicle 2) is employed as the assistance vehicle has been described, but an electric car on which a high-voltage storage cell is mounted and which is driven by the power supplied from this storage cell may be employed as the assistance vehicle. Moreover, a hybrid vehicle driven by motive energy obtained from an engine and the power supplied from the storage cell may be employed as the assistance vehicle. In such a case, the storage cells of the electric car and the hybrid vehicles function as one embodiment of the "power source" in the present invention.

Furthermore, in the above embodiment, an example in which the present invention is applied to the system for supplying the power from the power source of one assistance vehicle (the first vehicle 2) to the assisted vehicle (the second vehicle 3) has been described, but the present invention may be applied to a system for supplying the power from power sources mounted on a plurality of assistance vehicles to the assisted vehicle.

INDUSTRIAL APPLICABILITY

As described above in the embodiment, a vehicle assistance system according to the present invention can be applied to a case where a fuel cell vehicle is assisted. Moreover, the vehicle assistance system may be applied to a case where a vehicle (an electric car or a hybrid vehicle) other than the fuel cell vehicle is assisted.

The invention claimed is:

1. A vehicle assistance system comprising:
an assistance vehicle provided with a power source;
an assisted vehicle driven by power; and
an electric cable which electrically connects the assistance vehicle to the assisted vehicle,
wherein the power of the power source is supplied from the assistance vehicle to the assisted vehicle via the electric cable, and the assisted vehicle runs while receiving the power supply, and
wherein the assistance vehicle comprises a relay that is on/off controlled to perform power supply from the power source to outside and shutting of the supply, and a control device configured to turn on the relay to realize the power supply from the power source when an engine start key has been turned to a start position, and after turning on the relay, the control device is configured to realize a running in an assistance mode in which power consumption of the assistance vehicle is decreased as compared with usual running,
wherein the assistance vehicle has a storage cell,
wherein the assisted vehicle has wheels, and a traction motor which is driven by power supplied from the assistance vehicle via the electric cable to rotate the wheels and which generates power by the rotation of the wheels when the assisted vehicle and the assistance vehicle are driven while connected together, and
wherein the power generated in the traction motor by the rotation of the wheels during the running of the assisted vehicle is supplied to the storage cell of the assistance vehicle to charge the storage cell via the electric cable, whereby the regenerative braking of the assisted vehicle is realized.

2. The vehicle assistance system according to claim 1, wherein the assistance vehicle has a fuel cell and is driven by the power supplied from this fuel cell.

3. The vehicle assistance system according to claim 2, wherein the fuel cell of the assistance vehicle functions as the power source.

4. The vehicle assistance system according to claim 1, wherein the assistance vehicle is provided with a storage cell and driven by power supplied from this storage cell.

5. The vehicle assistance system according to claim 1, wherein the assistance vehicle is provided with a storage cell and an engine and driven by at least one of power supplied from the storage cell and motive energy obtained from the engine.

6. The vehicle assistance system according to claim 4, wherein the storage cell of the assistance vehicle functions as the power source.

7. The vehicle assistance system according to claim 1, wherein the assisted vehicle has a fuel cell and is driven by power supplied from this fuel cell.

8. The vehicle assistance system according to claim 1, wherein the assisted vehicle is provided with a storage cell and driven by power supplied from this storage cell.

9. The vehicle assistance system according to claim 1, wherein the assisted vehicle is provided with a storage cell and an engine and driven by at least one of power supplied from the storage cell and motive energy obtained from the engine.

10. An electric or hybrid vehicle assistance system comprising:
   an assistance vehicle provided with a power source;
   an assisted vehicle driven by power; and
   an electric cable that electrically connects the assistance vehicle to the assisted vehicle,
   wherein the power of the power source is supplied from the assistance vehicle to the assisted vehicle via the electric cable, and the assisted vehicle runs while receiving the power supply, and
   wherein the assistance vehicle comprises a relay switch that allows power to be supplied from the power source to outside or prevents the power from being supplied to outside, and a control device configured to turn on/off the relay based on an operating state of the assisted vehicle and the assistance vehicle,
   wherein the assisted vehicle and the assistance vehicle can be driven while connected together,
   wherein the power generated by the rotation of the wheels during the running of the assisted vehicle is supplied to a storage cell of the assistance vehicle to charge the storage cell via the electric cable, and
   wherein an electromotive power steering device of the assisted vehicle is powered by power from the power source of the assistance vehicle when the assisted vehicle and the assistance vehicle are connected together.

11. A vehicle assistance system comprising:
   an assistance vehicle provided with a power source;
   an assisted vehicle driven by power; and
   an electric cable that electrically connects the assistance vehicle to the assisted vehicle,
   wherein the power of the power source is supplied from the assistance vehicle to the assisted vehicle via the electric cable, and the assisted vehicle runs while receiving the power supply,
   wherein the assistance vehicle comprises a relay switch that allows power to be supplied from the power source to outside or prevents the power from being supplied to outside, and a control device configured to turn on/off the relay based on an operating state of the assisted vehicle and the assistance vehicle,
   wherein the assisted vehicle and the assistance vehicle can be driven while connected together, and
   wherein the power generated by the rotation of the wheels during the running of the assisted vehicle is supplied to a storage cell of the assistance vehicle to charge the storage cell via the electric cable.

* * * * *

UNITED STATES PATENT AND TRADEMARK OFFICE
CERTIFICATE OF CORRECTION

PATENT NO. : 8,428,802 B2
APPLICATION NO. : 12/293134
DATED : April 23, 2013
INVENTOR(S) : Mikio Kizaki Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 913 days.

Signed and Sealed this
Eighth Day of September, 2015

Michelle K. Lee
*Director of the United States Patent and Trademark Office*